April 23, 1974     A. LASSER     3,806,398
PLASTIC ARTICLES OF MANUFACTURE AND METHODS OF MAKING SAME
Filed Jan. 17, 1972
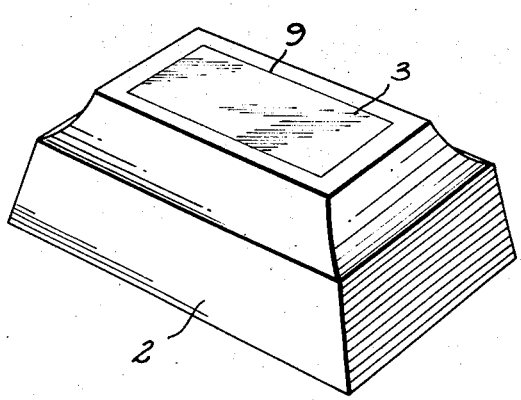
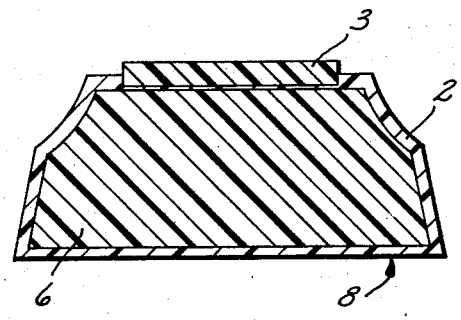
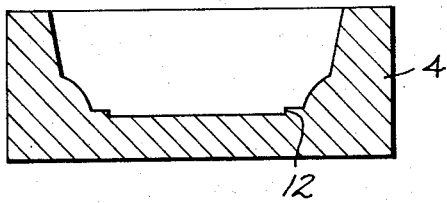
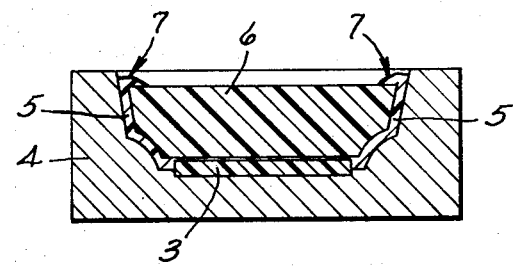
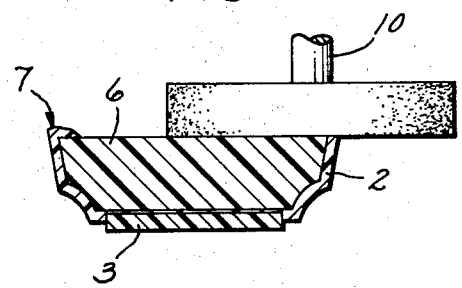
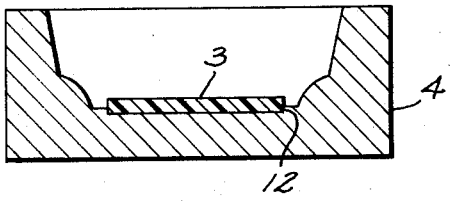
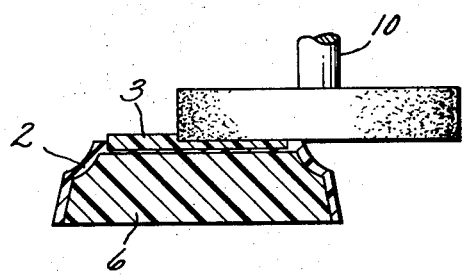
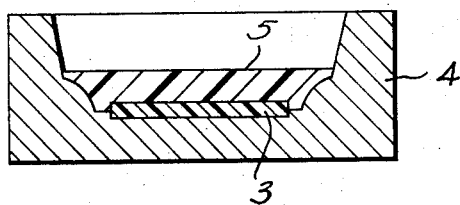

United States Patent Office 3,806,398
Patented Apr. 23, 1974

3,806,398
PLASTIC ARTICLES OF MANUFACTURE AND
METHODS OF MAKING SAME
Archie Lasser, Leonia, N.J., assignor to Revere Industries, Inc., Garfield, N.J.
Filed Jan. 17, 1972, Ser. No. 218,240
Int. Cl. B44f 1/00; B29c 19/00
U.S. Cl. 161—5
4 Claims

ABSTRACT OF THE DISCLOSURE

A plastic decorative base member containing a plastic insert member of different color in the top or face portion of said base. The juncture between the base and the insert presents no visible line of demarcation, so as to give the appearance that both plastic members are of integral one-piece construction. The base member may be filled with a slug member to increase its weight.

---

The invention pertains to decorative plastic articles of manufacture and methods of making same, and more particularly to plastic articles having a vari-colored face or top portion.

BACKGROUND OF THE INVENTION

The methods of making dichromatic or dichotomously colored plastic articles is well known in the art. For example: the patent to Joseph R. Mares, Pat. No. 2,428,-977; issued: Oct. 14, 1947, shows a thermosetting cast resinous block of different colored plastic.

Other patents showing similar bi-colored plastic articles and the processes for making them, may be seen in the patents to: Robert N. Barrett, Pat. No. 2,185,492; issued: Jan. 2, 1940; Vincent Fischett, Pat. No. 2,193,586; issued: Mar. 12, 1940; and J. Michaelson et al., Pat. No. 2,651,079; issued: Sept. 8, 1953.

The aforementioned patents all illustrate means of molding different colored plastics into decorative articles similar to that of the present invention.

The present invention, distinguishes itself from the other inventions, however, in being capable of contrasting different colored plastics without displaying a juncture or demarcation between the different plastics. This results in an eye pleasing effect where two colors are merged together in what appears to be an integral one-piece block of plastic.

The absence of a demarcation line between the plastic parts gives a rich decorative look to the resulting plastic article, and does not betray its inexpensive molded character. In other words, two-pieces may be made to look like one, although of different color or materials.

SUMMARY OF THE INVENTION

The one-piece appearance of the vari-colored plastic composite of this invention is achieved by uniquely combining two plastics:

First, a sheet of plastic is cut to size and shape to form an insert member for a mold. The insert is given a post-operative cure, i.e., it is fully cured in boiling water, or is fully cured by some other means such as by chemical formulation.

Second, the insert is placed in a mold, and a thermosetting liquid plastic is poured over it, to partially fill the mold.

Third, a slug, or weighted bar of material is added to the liquid plastic displacing it, so that the whole mold is filled by the liquid plastic; and Fourth, the liquid plastic is allowed to set, and the resulting assembly is removed from the mold, ground, and polished.

The insert is post-cured, so as to remove internal stresses and reduce shrinkage and contraction when the liquid base plastic is made to solidify about the insert. The liquid shrinks approximately 2%–6% causing it to tightly conform about the insert. Since the insert does not contract or shrink as the outer material contracts and shrinks around it, the two materials practically weld together to form a composite with the appearance of an integral one-piece construction. The juncture between the two plastics vanishes, or more accurately speaking, is squeezed out of existence.

It is an object of the present invention to provide a multi- or vari-colored plastic composite article having the appearance of an integral one-piece member;

It is another object of this invention to provide a fully cured plastic insert member prior to its being molded within the face of a plastic base member;

It is but another object of this invention to mold composites of various plastics in a "thin-walled" construction to reduce stresses due to shrinkage or contraction of the plastics upon curing, so that the plastics will not buckle or crack.

These and other objects of the invention will become more apparent, and will be better understood with reference to the following detailed description and accompanying drawings, in which:

FIG. 1 is a perspective view of a typical article of manufacture made in accordance with this invention;

FIG. 2 is a sectional view of the article of FIG. 1, prior to grinding the insert flush with the base;

FIG. 3 is a cutaway side view of the mold used for casting the article of FIG. 1;

FIG. 4 is a cutaway side view of the mold of FIG. 3 with an insert placed in the bottom thereof;

FIG. 5 is a cutaway side view of the mold and insert of FIG. 4 containing liquid plastic which has been poured into the mold;

FIG. 6 is a cutaway side view of the mold, insert, and liquid plastic of FIG. 5, with a filler or slug member added to the mold to displace the liquid plastic causing it to fill the mold;

FIG. 7 is a side view of the solidified plastic assembly removed from the mold in FIG. 6, with a grinding wheel grinding the bottom portion of said assembly to remove excess plastic runover; and FIG. 8 is the assembly of FIG. 7 being ground on a top portion thereof, to make the insert flush with the face of the solidified plastic base member.

Generally speaking, the invention is for decorative articles of manufacture, and methods of making same. A typical article of this invention, comprises a plastic base member with a plastic insert member contained in the face portion thereof. The insert and the base are of contrasting colors so as to provide a pleasing dichotomous visual effect. The juncture between the plastic insert member and the plastic base member has no visible demarcation line so as to give the appearance that both members are of integrable one-piece construction.

Now referring to FIG. 1, a perspective view of a typical article made in accordance with this invention is shown. The article consists of a plastic base 2 having a different colored plastic insert 3 in the top thereof. The demarcation or juncture 9 between the insert 3 and the base 2 is not visible to the eye so that the insert and base give the appearance of being one-piece.

The article is made by providing a female mold 4 as shown in FIG. 3. The insert 3 is placed in the bottom well 12 of the mold 4 as depicted in FIG. 4. Next, a liquid resin or plastic 5 is poured into the mold as shown in FIG. 5. The plastic is poured to only partially fill the mold. Then, a slug or preformed filler 6 is dropped into the liquid plastic 5 as illustrated in FIG. 6. The liquid 5 is displaced by the slug 6 and rises to the top of the mold, where some of the liquid runs over the top of the slug 6 as shown by arrows 7. This excess material may be ground off after solidification by using a grinding wheel 10, as will later be explained with reference to FIG. 7. If more liquid is added, however, the slug may be enveloped in the liquid, resulting in a thin layer 8 of encapsulating plastic for the slug, as depicted in FIG. 2, which is a sectional view of the solidified plastic composite after it has been removed from the mold 4. FIGS. 7 and 8, illustrate a side view of the resultant solidified assembly of FIG. 2 after it has been removed from the mold 4 of FIG. 6.

A grinding wheel 10, is used to grind off the plastic excess 7 on the bottom of the base 2 (FIG. 7) and also to grind the insert 3 flush with the base 2 (FIG. 8). After grinding, the surfaces are polished to give them a luster.

The slug 6 is made nearly the same size as the mold 4 so that the base shell 2 is "thin-walled." This "thin-walled" construction is not only desirable, but essential to the invention, since it reduces the internal stresses in the plastic shell. The reduction of stresses prevents cracking and buckling in the plastic members as the liquid shell 5 contracts and/or shrinks about the insert.

The insert is similarly made of thin sheet to reduce stress. The insert is cut from plastic sheet stock to fit within and conform to the well 12 of mold 4 (FIGS. 3 and 4). The insert 3 is given a post-operative cure, to reduce internal stresses in the insert, and reduce its contraction or shrinkage prior to being cast within the base 2. This is accomplished by subjecting the insert to sufficient heat for a sufficient length of time. If the insert is made of polyester (acrylic) it may be fully cured by immersing it in boiling water (212° F.) for approximately 10 minutes. The insert may also be room temperature cured by means of adding chemical curing agents to the resin.

The base 2 may be made of a polyester, such as GR 415, GR 511, or GR 42R, or a blend of these, made by the Marco Chemical Corporation, 1711 Elizabeth Ave., Linden, N.J., or a polyester No. 50111 made by PPG Industries, or Formula No. 4123, or 4134 made by American Cyanamid, Wallingford, Conn.

The base 2 may also be vacuum formed over a male mold containing the insert 3, with the slug 6 being poured into the vacuum-formed base shell thereafter.

Also, the finished assembly may be injection molded with slug and insert placed within the injection mold. For this operation, ABS (Cycolac) or polystyrene may be used for the base material.

The insert contrasts in color with the shell of the base. The shell may be onyx, opaque, transparent, translucent, pearlized, and three-dimensional, etc. The insert may be pearlized, tortoise, tinselled, amber, jade, and of other colors and effects.

The molds of the casting method may be rigid forms of acetate, silicon rubber, glass, or any material with a highly polished surface as for example a chrome-plated mold. Similar molds may be made when casting the preformed filler or slug 6.

The articles that can be made with this process, can be used for desk-pen bases, lamp bases, trophy bases, bathroom accessory bases, decorative tile, and molded base piece for a variety of decorative uses.

Holes may be drilled in the articles to attach other parts to them, or to attach the bases to walls or home fixtures. For example, the slug 6 may not be used where the base is cast as a thin sheet so that it may be used as a cover plate for a light switch. Of course, the proper holes must be provided for the switch knob and for the mounting screws.

Another use for the article may be as a mounting for diplomas, patents, or other important documents. The uses of the article of this invention are as boundless as the imagination of the maker.

The base may be made from any one of the following general plastics: polyesters, co-polymers, and monomers, and blends of these.

Similarly, the insert may also consist of the same materials as the base or different blends of the aforementioned general plastics: polyesters, co-polymers, and monomers.

The slug may be made from the base material with the addition of weighting material such as marble dust.

The base, insert, and slug may be made in any convenient shape, such as circular, elliptical, oblong, amorphous-like, square, rectangular, triangular, etc., etc.

The figures and the preferred process disclosed herein are meant to be merely exemplary of the inventive concept, and should not be interpreted as limiting the scope, spirit or purview of the invention in any way. The breadth of the invention should be judged with reference to the appended claims.

What I claim is:

1. An article of manufacture, comprising a plastic base member that has been molded in the liquid state about a plastic insert member and a slug member, said insert member being located in a face portion of said base member after solidification of the base member, said members being of different colors so as to provide a pleasing dichotomous visual effect in said face portion of said base member, said insert member being substantially fully cured prior to being molded within the plastic face portion of said base member so as to substantially remove internal stresses and reduce shrinkage and contraction of said insert, said slug member being molded within said base member to provide a wall of said base member of sufficient thinness to reduce stresses of said member with respect to said insert, said plastic base member solidifying about said insert member forming a demarcation between said members which is not visibly detectable, both said members appearing to be of integral one-piece construction.

2. The article of manufacture of claim 1, wherein the base member is a thermosetting resin which has been molded about said insert member, said insert member having received a post-operative cure.

3. The article of manufacture of claim 1, wherein the plastic base member is composed of a plastic or blend of plastics of the type: polyester, co-polymer, and monomer.

4. The article of manufacture of claim 1, wherein the plastic insert member is composed of a plastic or blend of plastics of the type: polyester, co-polymer, and monomer.

References Cited

UNITED STATES PATENTS

| 2,428,977 | 10/1947 | Mares | 264—247 |
| 3,072,973 | 1/1963 | Barnette | 264—247 |
| 2,913,770 | 11/1959 | Beno | 264—Dig. 59 |
| 2,379,248 | 6/1945 | Muskat | 264—Dig. 59 |
| 2,682,111 | 6/1954 | Kish | 264—275 |
| 2,781,597 | 2/1957 | Doane | 264—247 |

GEORGE F. LESMES, Primary Examiner

P. J. THIBODEAU, Assistant Examiner

U.S. Cl. X.R.

264—172, 247, 261, 275